United States Patent
Weigl et al.

(10) Patent No.: US 7,466,717 B1
(45) Date of Patent: Dec. 16, 2008

(54) METHOD AND DEVICE FOR EXCHANGING DATA BETWEEN AT LEAST TWO USERS THAT ARE CONNECTED TO A BUS SYSTEM

(75) Inventors: Andreas Weigl, Linkenheim-Hochstetten (DE); Thomas Fuehrer, Gerlingen (DE); Bernd Mueller, Leonberg (DE); Florian Hartwich, Reutlingen (DE); Robert Hugel, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 985 days.

(21) Appl. No.: 10/169,517

(22) PCT Filed: Nov. 14, 2000

(86) PCT No.: PCT/DE00/04021

§ 371 (c)(1),
(2), (4) Date: Nov. 5, 2002

(87) PCT Pub. No.: WO01/52074

PCT Pub. Date: Jul. 19, 2001

(30) Foreign Application Priority Data

Jan. 5, 2000 (DE) .............................. 100 00 305

(51) Int. Cl.
*H04L 12/42* (2006.01)
*H04B 1/44* (2006.01)
*H04J 3/06* (2006.01)

(52) U.S. Cl. .................. 370/451; 370/282; 370/503

(58) Field of Classification Search ........... 370/254, 370/257, 326, 329, 336, 440, 451, 458, 468, 370/470, 473, 477, 508, 252, 360, 489, 312, 370/510, 503; 713/500, 502, 501, 600
See application file for complete search history.

(56) References Cited

U.S. PATENT DOCUMENTS

| 4,740,955 | A * | 4/1988 | Litterer et al. ............... 370/264 |
| 4,815,110 | A | 3/1989 | Benson et al. |
| 5,689,688 | A * | 11/1997 | Strong et al. ................. 713/375 |
| 6,357,014 | B1 * | 3/2002 | Correia ........................ 713/502 |
| 6,496,885 | B1 * | 12/2002 | Smart et al. .................. 710/100 |
| 6,535,489 | B1 * | 3/2003 | Merchant et al. ............ 370/244 |
| 6,535,926 | B1 * | 3/2003 | Esker ........................ 709/248 |
| 6,591,369 | B1 * | 7/2003 | Edwards et al. ............. 713/400 |
| 7,009,995 | B1 * | 3/2006 | Bohrer et al. ................ 370/460 |
| 2005/0058061 | A1 * | 3/2005 | Shaffer et al. ................ 370/216 |

FOREIGN PATENT DOCUMENTS

EP 0 675 445 10/1995

OTHER PUBLICATIONS

Time Triggered Communication on CAN by Walther et al Proceedings 7th International CAN conference 2000 Oct. 24-25, 2000, Amsterdam, Netherland.*
Decotignie et al., "Producer-Distributor-Consumer Model on Controller Area Network," Proc. of the IFAC/IFIC Workshop, Nov. 6, 1995.

* cited by examiner

*Primary Examiner*—Hanh Nguyen
(74) *Attorney, Agent, or Firm*—Kenyon & Kenyon LLP

(57) ABSTRACT

A method and a device for exchanging data in messages between at least two stations connected by a bus system. The messages contain the data being transmitted by the stations over the bus system. Each message contains an identifier characterizing the data contained therein. Each station decides on the basis of the identifier whether to receive the message. The messages are controlled in time by a first station. The first station repeatedly transmits a reference message over the bus in at least one specifiable time interval. The time interval is subdivided into time windows of a specifiable length, the messages being transmitted in the time windows.

12 Claims, 4 Drawing Sheets

FIG. 4

| | Time window TRM (column in the Matrix) TWØM | Time window TW TW1a | Time Window TW2a | Time Window TW3a | TW4a | TW5a |
|---|---|---|---|---|---|---|
| BCØa | Time reference message 400 | 401 A | 402 E | 403 arbitrating | 404 A | 405 B |
| BC1a | Time reference message 406 | 407 A | 408 E | 409 | 410 A | 411 C |
| BC2a | Time reference message 412 | 413 A | 414 E | 415 D | 416 A | 417 C |
| BC3a | Time reference message 418 | 419 A | 420 E | 421 | 422 A | 423 B |
| BC4a | Time reference message 424 | 425 A | 426 E | 427 arbitrating | 428 A | 429 B |
| BC5a | Time reference message 430 | 431 A | 432 E | 433 F | 434 A | 435 C |
| BC6a | Time reference message 436 | 437 A | 438 E | 439 D | 440 A | 441 C |
| BC7a | Time reference message 442 | 443 A | 444 E | 445 | 446 A | 447 C |

Basic Cycle BC (line in the Matrix)

Lead-off cycle

Total Cycle TC2 (Matrix)

A..F ≙ Transmit groups

Arbitrating = reserved time windows for arbitrating messages

METHOD AND DEVICE FOR EXCHANGING DATA BETWEEN AT LEAST TWO USERS THAT ARE CONNECTED TO A BUS SYSTEM

FIELD OF THE INVENTION

The present invention relates to a method and device for exchanging data between at least two stations connected to a bus system.

BACKGROUND INFORMATION

The CAN protocol is available for automotive networking, which regulates event-controlled communication. This may result in very high loads if various messages are to be transmitted at the same time. The nondestructive arbitration mechanism of CAN guarantees, or at least makes more probable, sequential transmission of all messages according to the priority of their associated identifiers or markers. For hard real-time systems, an analysis of the running times and bus loads should first be performed for the entire system to ensure, or at least make more probable, that all message deadlines (even at peak loads) will be met.

Communication protocols may be based on time-controlled processing, such as, for example, TTP/C or Interbus-S. According to these protocols, bus access is planned in advance by issuing transmission times. Thus, there may not be collisions during running time. However, a peak load on the communication bus may be avoided. Therefore, the bus may not be utilized to its full capacity.

It is believed that the related art is not capable of yielding optimum results in all regards.

SUMMARY

The present invention relates to a method and a device for exchanging data in communications between at least two stations connected by a bus system, the messages containing the data being transmitted by the stations over the bus system, and each message containing an identifier characterizing the data contained therein, each station deciding on the basis of the identifier whether to receive the message. For example, a CAN bus may be used as the basic bus system or bus protocol. However, any bus system or bus protocol may be used that employs an object-oriented message or data transmission, so that the message and/or data contained therein is identifiable by an identifier. This may be true, for example, of those buses, in which the messages or data are addressed rather than the stations, for example, the CAN bus.

The messages may be controlled in time by a first station, so that the first station repeatedly transmits a reference message over the bus in at least one specifiable time interval, and the time interval is subdivided into time windows of a specifiable length, the messages being transmitted in the time windows.

The present invention includes a higher protocol layer than the actual bus (CAN) protocol, in comparison with the related art. This protocol remains unchanged in the context of time-controlled communication. Time-controlled communication thus may permit the capacity of the bus to be fully utilized, while simultaneously keeping latency times for each message at a defined level.

An exemplary embodiment according to the present invention includes a cyclically sequencing transmission of bus (CAN) messages, which creates a deterministic and combinable communication system (e.g., a TTCAN system). Likewise, for example, a CAN bus may be used in the exemplary embodiment described herein, the considerations described above applying to bus systems or bus protocols having object-oriented message transmission.

The reference message and the following time windows until the next reference message are combined into a first cycle of a specifiable length and/or specifiable structure, the structure corresponding to the length, number and chronological position of the time windows following the reference message in the time interval.

In addition, a plurality of first cycles of the same structure are combined into a second cycle, messages also being repeatedly transmitted in the second cycle in time windows, the time intervals of which are greater than the time length of the first cycle.

A cyclic message transmission is omitted in at least one time window of the first or second cycle. Then, arbitrating messages, i.e., messages that need not be transmitted cyclically, but instead may be available when certain sequences are ended, for example, may be transmitted in these initially empty time windows.

BRIEF DESCRIPTION OF THE DRAWINGS

FIG. 4 is a diagram showing a total cycle having seven basic cycles and various transmit groups of the messages and arbitrating messages.

DETAILED DESCRIPTION

Figure 2:
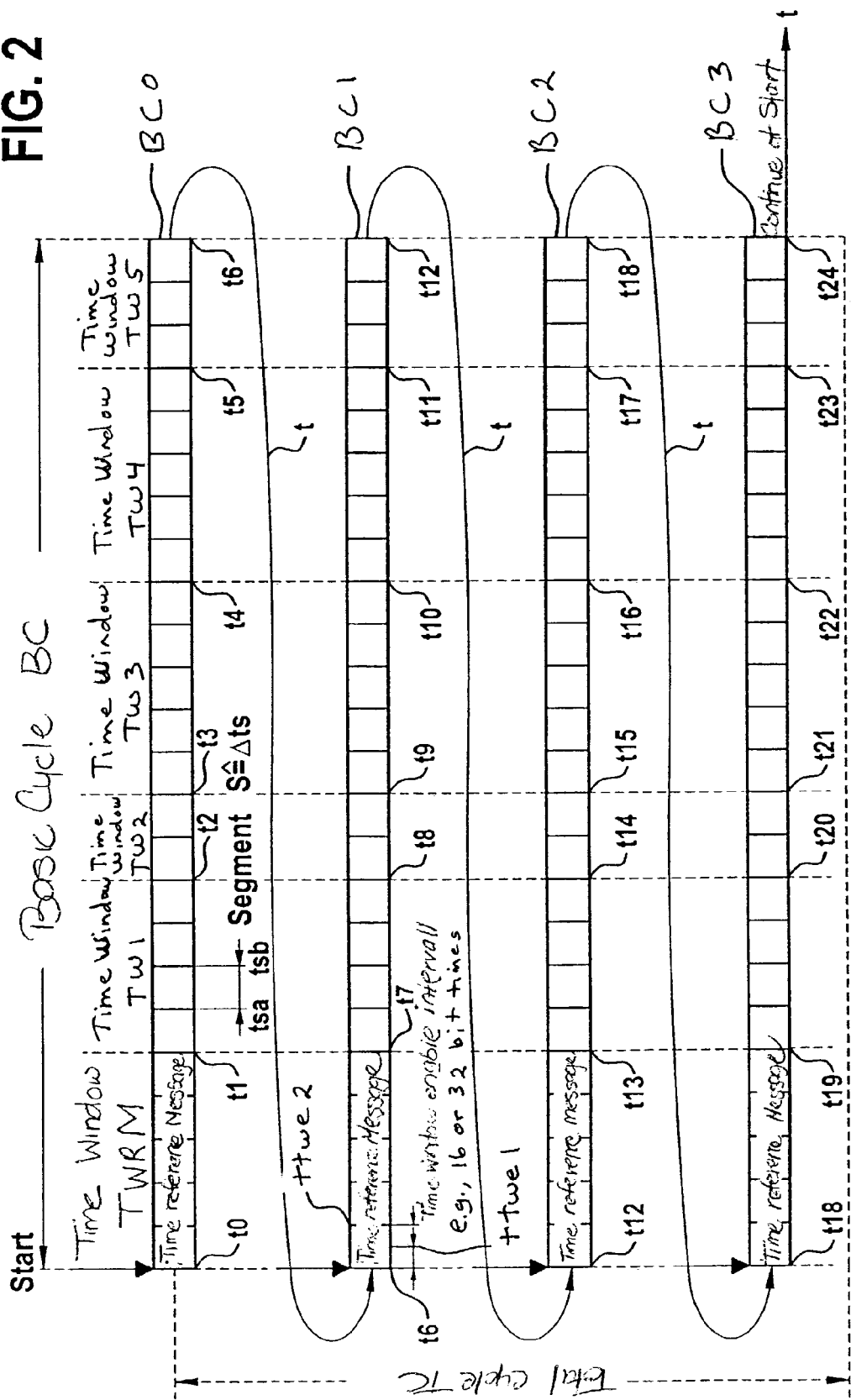
FIG. 2 is a diagram showing the basic sequence of first cycles or basic cycles and second cycles, the total cycles over time.

TTCAN is based on a time-controlled periodic communication, which is cycled by a timer (nodes, stations) using a time reference message (i.e., a short reference message RM). The basic cycle is the period until next reference message RM, which is subdivided into n time windows, as shown in FIG. 2. Each time window allows exclusive transmission of a periodic message of differing lengths. These periodic messages are sent in a TTCAN controller by using time marks linked to the sequence of a logic relative time. TTCAN, however, permits free time windows to be considered. These time windows may be used for spontaneous messages, in which access to the bus via the arbitration scheme of CAN within these time windows is utilized (arbitrating messages). Synchronization of the timer clock (global time gT) with the internal local time of individual nodes IT1 to IT4 is considered and efficiently implemented.

Figure 1:
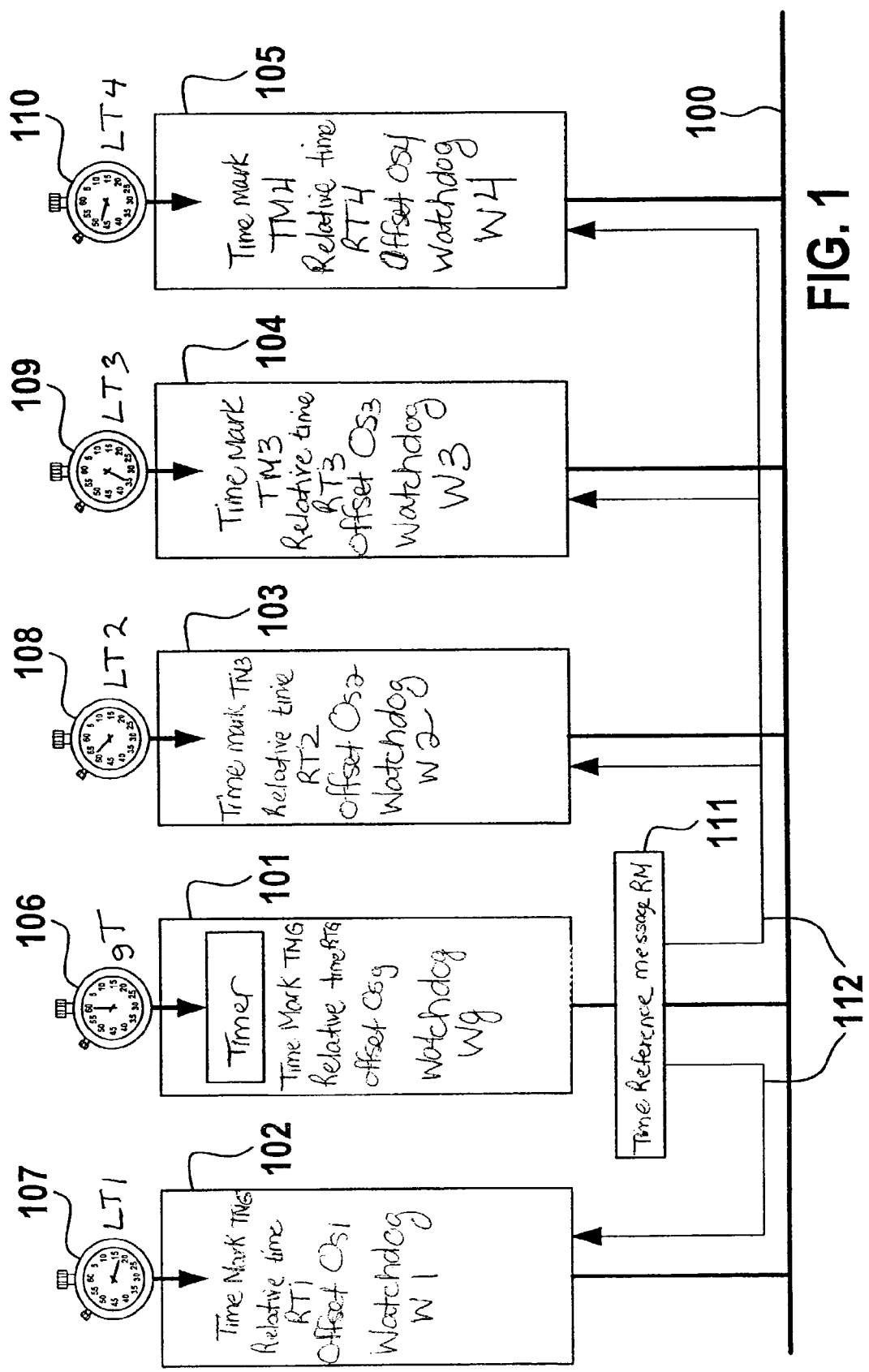
FIG. 1 is a block diagram of a bus system having a plurality of stations.

FIG. 1 shows a bus system 100 having a plurality of stations 101 through 105, each of which has its own time base 106 through 110, which may be generated, for example, by an internal arrangement, such as a clock, a counter, a clock generator, etc. or which may be externally transmitted to the respective station. Respective local time base IT1 through IT4 may be, for example, a counter, e.g., a 16-bit incrementing counter, which may be influenced only by an HW reset. The local time base is implemented in each node or station 102 through 105. One station, e.g., timer 101, has an exposed position. Its time base is designated as global time base 106 having global time gT and is either implemented in timer 101 or is externally transmitted to timer 101. Global time gT is formed in each node from local time base 107 through 110, i.e., local time IT (IT1 through IT4) and an offset OS1 through OS4. This offset Osg, in timer 101, may be equal to zero (Osg=0). All other nodes form their global time gT from local time IT (IT1 through IT4) and local offset OS1 through OS4 and OSg, when OSg≠0. When OSg is not zero, e.g., when global time gT is externally transmitted to timer 101, which additionally contains its own time base 106, the timer may then be calibrated to global time gT, and gT and time base 106 may not match. The local offset is the difference between the local time at the transmission time (SOF, start of frame) of the reference message and the global time transmitted by the timer in this reference message.

Local Time Base and Global Time

Local time base: The local time base may be a counter, e.g., a 16-bit incrementing counter, which may be influenced only by a HW reset. The local time base is implemented in each node.

Reference mark buffer register: With each assumed SOF, the buffer register is loaded with the local time base.

Reference marker: If the instantaneous message is recognized as a reference message, then the value from the buffer register retrieved by the reference marker (as a local reference mark). The reference marker may be, for example, a 16-bit register, for example.

Timer reference mark: This is the reference mark of the timer in the reference message received by the timekeepers.

Local offset to the global time: The local offset to the global time is the difference between the reference mark in the buffer register and the global time mark received in the reference message. It is used to calculate the global time from the local time. The offset of the timer remains constant. The timer sends its local reference mark plus the local offset in the reference message.

Timer 101 is also the node, i.e., station, communicating time reference message 111, i.e., reference message RM. Arrow 112 indicates that reference message RM 111 may be sent, for example, concurrently, to the other stations 102 through 105.

Reference message RM is the basis for time-controlled, periodic operation of TTCAN. It is identified by a special identifier and is received by nodes as a timer, for example, nodes 102 through 105. Timer 101 may, for example, cyclically emit reference message RM. The reference message may contain, for example, the number of instantaneous basic cycle BCn, the reference mark of the timer in global time, etc.

The reference mark is formed by accepting the internal counter status at the time of the start-of-frame bit (SOF) on reception of the reference message of the timer. The reference mark is thus a one-shot display of the local time base at the time of receiving the reference message. Relative time RT1 to RT4, listed in the stations, and RTg refer to the difference between the local time base and the last reference mark. All the definitions, with respect to the time marks used, are based on the relative time of an individual station, which may be permanent, e.g., in the form of a signal (e.g., by linking the two register values by gates). The reference mark determines the relative time of all nodes on the TTCAN bus.

Watchdog Wg and W1 through W4 are relative points in time. At each node, such a relative point in time (watchdog) is defined, at which a new reference message and a reference mark is expected at the latest. Thus, the watchdog is a time mark and is mainly used in initializing and reinitializing for monitoring whether any communication has occurred. In this case, the watchdog should be greater than the distance between reference messages.

A time mark is a relative point in time that establishes the relationship between the relative time and an action in the original bus (CAN) controller. A time mark is represented as a register, one controller optionally managing multiple time marks. A plurality of time marks may be assigned to one message. For example, as shown in FIG. 4, transmit group A occurs in both time window TW1a and time window TW4a.

An application watchdog may be used with regard to the application. The application should regularly operate the watchdog to signal to the TTCAN controller that operation is in proper condition. Only when the application operates the watchdog are messages sent by the CAN controller.

FIG. 2 shows a time-controlled, periodic message and data transmission over time. This message transmission is cycled by the timer using the reference message. Period of time t0 through t6 is referred to as a basic cycle BC and is subdivided into k time windows (k∈N). Reference messages RM of respective basic cycles BC0 through BC3 are transmitted from t0 through t1, t6 through t7, t12 through t13 and t18 through t19, i.e., in time window TWRM. The structure of time windows TW1 through TW5, which follow a reference message RM, i.e., their length (in segments S where Δts=tsb−tsa), their number and their chronological position, is specifiable. Therefore, a total cycle TC1, which begins at t0 and ends at t24 and then is executed again, may be formed from multiple basic cycles having the same structure. The time windows may include, for example, two through five segments, each segment having 32 bit times. The number of time windows may be, for example, two through sixteen, but only one time window or more than sixteen time windows may be provided. The number of basic cycles in a total cycle may be, for example, $2^m$, in which, for example, m≦4.

Two transmit enable intervals, i.e., time window enable intervals, may be characterized by ttwe1 and ttwe2, for example, lasting 16 or 32 bit times, respectively, and may describe the time frame within which the message may be sent with respect to the basic cycle.

Figure 3:
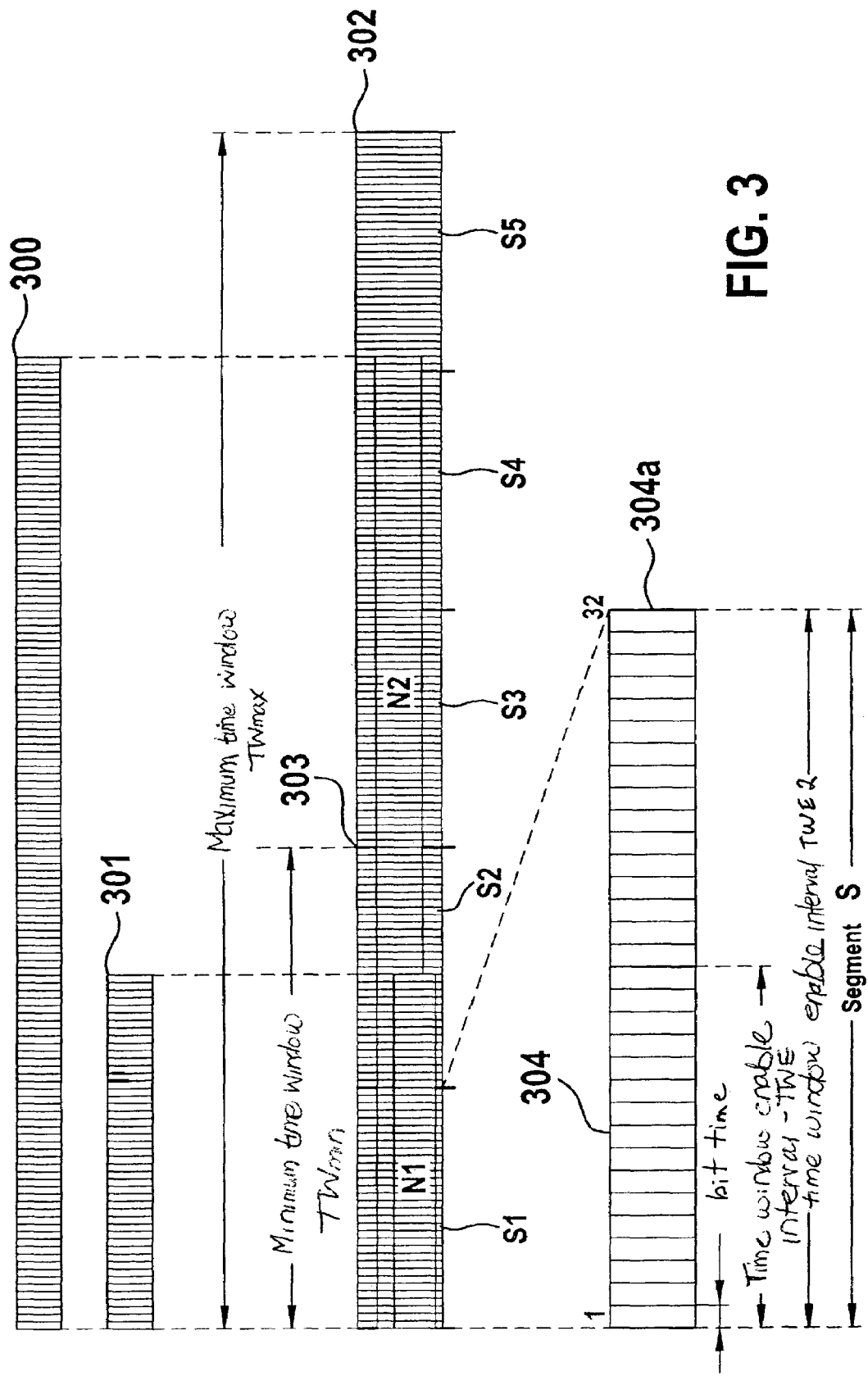
FIG. 3 is a diagram showing further detail of the creation and message occupancy of the time windows.

Each time window allows exclusive transmission of a periodic message having different lengths. FIG. 3 shows, for example, two messages of different lengths and their assignment in the time window. Message 1 (M1), i.e., block 300 may include, for example, 130 bits, and message 2 (M2), i.e., block 301, may include, for example, 47 bits.

As described above, maximum and minimum time windows may be specified, depending on the message length, for example, between two and five segments per time window. Thus, a maximum time window TWmax is specified as block 302, which includes five segments (S1 through S5), each with 32 bit times, and a minimum time window TWmin is specified as block 103, which includes two segments (S1 and S2), each with 32 bit times. Messages M1 and M2 are transmitted in these windows, but the messages need not completely fill the time windows, and instead the time window sizes are specified according to the length of the message. TWmax should thus offer sufficient time and/or space for the longest possible message, e.g., 130 bits, i.e., bit times, and TWmin may be adapted to the shortest possible message, e.g., 47 bits.

The time window is the time frame available for a certain message, as shown in FIG. 3. The time window of a message is opened when a transmit enable is applied, and the beginning of this window corresponds to a defined time mark. The length of the time window may be determined, for example, from i segments having 32 bit times (see block 304a). Segmentation into 32 bit times, for example, may represent a HW-friendly variable. The time window should not be shorter than the longest message occurring in this time window. The bit time may be, for example, the nominal CAN bit time.

The transmit enable interval or time window enable interval describes the time frame, within which the transmitting of the message may begin. The transmit enable interval is a portion of the time window. The enable is thus applied in the interval time mark and time mark plus delta. The delta value is smaller than the length of the time window (e.g., 16 or 32 bit times for TWE1 or TWE2). A message, the beginning of which does not lie within the transmit enable interval, should not be transmitted.

FIG. 4 shows a total cycle (transmission matrix) TC2.

Total cycle (transmission matrix): All messages (RM, A through F and arbitrating) of all stations are organized as components of a transmission matrix, as shown in see FIG. 4. The transmission matrix is composed of individual basic cycles BC0a through BC7a. All basic cycles of total cycle TC2 have the same structure. These basic cycles may optionally be composed of exclusive components (A through F) and arbitrating components. The total number of lines (i.e., basic cycles BC0a through BC7a) may be, for example, a number $2^m=8$, in which m=3.

A basic cycle (line of the transmission matrix) begins with a reference mark in reference message RM and is composed of a plurality (i) of successive time windows of a defined length (first time window TW0, or TWRM for RM). The arrangement of messages within the basic cycle may be freely defined. A time window is linked to a CAN message object for exclusive components. A time window may also be left blank (409, 421, 441, 417, 445) or used for arbitrating components (403, 427).

A transmit group (column of transmission matrix, A through F) is formed by messages that are sent in the same time window, but in different basic cycles (see FIG. 4). Thus, a period, e.g., A in TW1a and TW4a: 401, 407, 413, 419, 425, 431, 437, 443 and 404, 410, 416, 422, 428, 434, 440, 446 may be created.

Within a transmit group, a message object (of a time window) may be transmitted multiple times. The period of a message within a transmit group should be a number $2^l$, where $1 \leq m$.

The message object, i.e., the message, corresponds to the message object of the bus, for example, in CAN, and includes the identifier as well as the data. In TTCAN, the message object is supplemented by at least one of the following entries in the transmission matrix, for example, all three entries: time window, basic mark, and repeat rate.

The time window is the position (TW0, TW1a through TW5a) in the basic cycle (BCn, row of the transmission matrix). The beginning of the time window is defined by reaching a certain time mark.

The basic mark indicates in which basic cycle (BC0a through BC7a) in the total cycle the message is sent for the first time.

The repeat rate defines how many basic cycles elapse before this transmission is repeated.

To characterize the validity of a message object for the CAN controller, there exists a "permanent transmit request," which is a permanent enable of the object (for exclusive components, see below) and an "individual transmit request," which denotes a one-time validity of the object (for arbitrating components, described below).

Automatic retransmission from CAN is expediently disabled for messages in TTCAN.

Message transmission—periodic messages and spontaneous messages in the basic cycle and in the total cycle, for example, with respect to the application—is described below, in which a distinction is made between exclusive messages, i.e., periodic messages, and arbitrating messages, i.e., spontaneous messages.

Exclusive Message Objects (Periodic Messages):

Exclusive message objects are sent when the application watchdog is set, the "permanent transmit request" of the application to the CAN controller is set and the transmit enable interval of the respective time window has been opened. In this case, the time mark for the message object corresponds to the relative time. The permanent transmit request remains set until it is reset by the application itself.

Arbitrating Message Objects (Spontaneous Messages):

Arbitrating message objects are sent when the application watchdog is set, the "individual transmit request" from the application to the CAN controller is set and the transmit enable interval of the next time window intended for this purpose has been opened. Then, the time mark for this time window is equal to the relative time. The transmit request is reset by the CAN controller after successful transmission. The simultaneous access of various spontaneous messages is regulated via the bit arbitration of CAN. If a spontaneous message in this time window loses with respect to another spontaneous message, it may compete for bus access only in the next time window intended for this purpose.

If the entire transmission matrix or the total cycle has been executed, a cyclic, time-controlled message transmission results, in which "Time-controlled" indicates that each action emanates from the fact that a certain point in time has been reached (see time marks and relative time). If the total cycle has been executed completely, i.e., all the basic cycles have been processed once, the sequence begins again with the first basic cycle of the transmission matrix. This does not result in any time gaps in the transition. An overview of such a time-controlled communication system having a timer is presented in the description and in the figures of the drawing.

What is claimed is:

1. A method of exchanging data between a plurality of stations connected by a bus system, the data being contained in messages, each of the messages including a respective identifier characterizing a respective portion of the data contained therein, each of the plurality of stations deciding whether to receive each of the messages on the basis of the respective identifier, the method comprising:

repeatedly transmitting, by a first one of the plurality of stations, a reference message, the reference message containing time information of the first one of the plurality of stations, the reference message being transmitted over the bus system in at least one specifiable time interval, the at least one specifiable time interval being subdivided into a plurality of time windows, each of the plurality of time windows having a specifiable length; and transmitting the messages containing the data in the plurality of time windows;

combining the reference message and time windows of the plurality of time windows following the reference message until a next reference message into a first cycle of one of i) a specifiable length, and ii) a specifiable structure corresponding to a length, a number and a chronological position of the time windows following the reference message in the at least one specifiable time interval.

2. The method according to claim 1, wherein the reference message is characterized by a unique identifier.

3. The method according to claim 1, wherein the time information of the first one of the stations corresponds to a reference mark of the first one of the plurality of stations.

4. The method according to claim 1, wherein the first cycle and cycles following the first cycle are assigned respective numbers, the reference message containing the respective number of an instantaneous one of the cycles.

5. The method according to claim 1, wherein each of the messages are assigned to a respective one of the plurality of time windows.

6. The method according to claim 1, wherein a plurality of the first cycles of a same structure are combined into a second cycle, messages being repeatedly transmitted in the second cycle in ones of the plurality of time windows having time intervals greater than a time length of the first cycles.

7. The method according to claim 1, wherein the messages are cyclically transmitted in the plurality of time windows.

8. The method according to claim 7, further comprising:
transmitting arbitrating messages in the at least one of the plurality of time windows in which the cyclic message transmission is omitted.

9. The method according to claim 1, further comprising:
defining a relative time at which a new reference message is expected at the latest in each of the plurality of stations.

10. A method of exchanging data between a plurality of stations connected by a bus system, the data being contained in messages, each of the messages including a respective identifier characterizing a respective portion of the data contained therein, each of the plurality of stations deciding whether to receive each of the messages on the basis of the respective identifier, the method comprising:
repeatedly transmitting, by a first one of the plurality of stations, a reference message, the reference message containing time information of the first one of the plurality of stations, the reference message being transmitted over the bus system in at least one specifiable time interval, the at least one specifiable time interval being subdivided into a plurality of time windows, each of the plurality of time windows having a specifiable length; and
transmitting the messages containing the data in the plurality of time windows;
wherein at least one of the plurality of time windows includes a transmit enable interval, a respective one of the messages being allowed for transmission only if a beginning of the respective one of the messages is within the transmit enable interval.

11. A device for exchanging data between a plurality of stations connected by a bus system, the data being contained in messages, each of the messages including a respective identifier characterizing a respective portion of the data contained therein, each of the plurality of stations deciding whether to receive each of the messages on the basis of the respective identifier, the device comprising:
a transmitter in a first one of the plurality of stations configured to repeatedly transmit a reference message, the reference message containing time information of the first one of the plurality of stations, the reference message being transmitted over the bus system in at least one specifiable time interval, the at least one specifiable time interval being subdivided into a plurality of time windows, each of the plurality of time windows having a specifiable length, the messages being transmitted in the plurality of time windows;
wherein at least one of the plurality of time windows includes a transmit enable interval, a respective one of the messages being allowed for transmission only if a beginning of the respective one of the messages is within the transmit enable interval.

12. A bus system for exchanging data between a plurality of stations connected by the bus system, the data being contained in messages, each of the messages including a respective identifier characterizing a respective portion of the data contained therein, each of the plurality of stations deciding whether to receive each of the messages on the basis of the respective identifier, the bus system comprising:
a bus, a first one of the plurality of stations repeatedly transmitting a reference message over the bus, the reference message containing time information of the first one of the plurality of stations, the reference message being transmitted over the bus in at least one specifiable time interval, the at least one specifiable time interval being subdivided into a plurality of time windows, each of the plurality of time windows having a specifiable length, the messages being transmitted in the plurality of time windows;
wherein at least one of the plurality of time windows includes a transmit enable interval, a respective one of the messages being allowed for transmission only if a beginning of the respective one of the messages is within the transmit enable interval.

* * * * *